ROBERT M. MURCH
THOMAS BIENIEK
INVENTORS

ROBERT M. MURCH
THOMAS BIENIEK
INVENTORS

ATTORNEY

United States Patent Office 3,563,918
Patented Feb. 16, 1971

3,563,918
METAL CONTAINING POLYMERS FROM CYCLIC TETRAMERIC PHENYLPHOSPHONITRILAMIDES
Robert M. Murch, Ashton, and Thomas Bieniek, Glen Burnie, Md., assignors, by mesne assignments, to the United States of America as represented by the Administrator of the National Aeronautics and Space Administration
Filed Mar. 18, 1968, Ser. No. 713,616
Int. Cl. C08g *33/16;* C07d *105/02*
U.S. Cl. 260—2    17 Claims

ABSTRACT OF THE DISCLOSURE

New polymers have been prepared which contain both cyclic tetrameric tetraphenylphosphonitrilic units and transition metal salts containing metallic cations chosen from the group consisting of copper (II), cobalt (II), nickel (II), and iron (II). These polymers are unique in phosphonitrilic chemistry in that they are soluble in common organic solvents and are thermally stable above 500° C.

---

Figure 1:
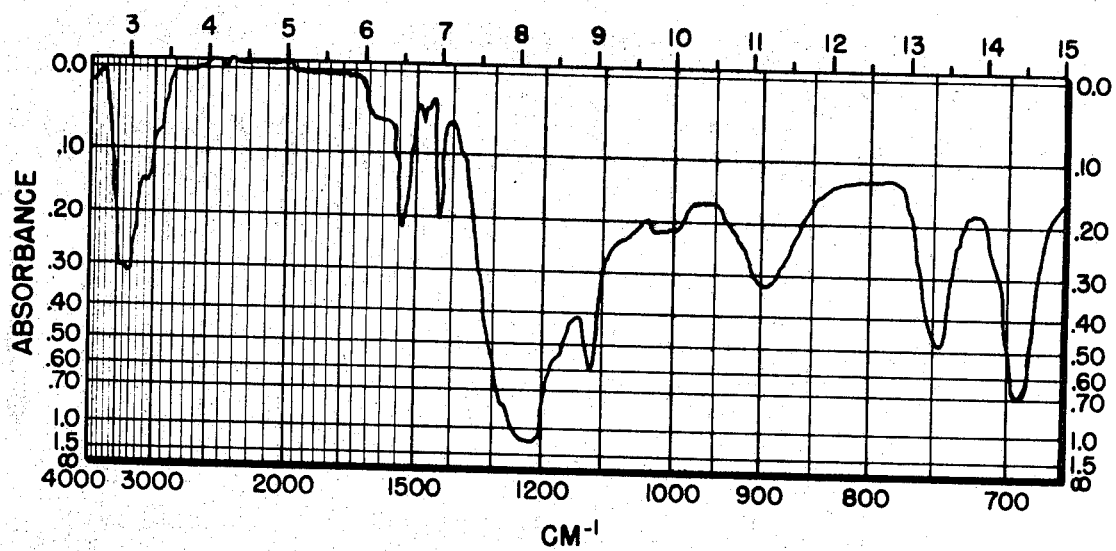

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to the preparation of new polymers based on cyclic tetrameric tetraphenylphosphonitriltetraamides. In a more particular aspect, this invention relates to the preparation of a polymer family which is thermally stable above 500° C., and yet is soluble in common organic solvents. This polymer family can be characterized as a phosphonitrilic polymer composition comprising 75–95% by weight of deammoniated polymeric $[C_6H_5PN(NH_2)]_4$ and from 20–50 mole percent, based on the polymeric $[C_6H_5PN(NH_2)]_4$ present, of an ion selected from the group consisting of copper (II), cobalt (II), iron (II), and nickel (II).

In order to understand the value of this new polymer family, a brief summary of the art will be useful.

A polymeric material which is to be useful in high temperature applications (molding compounds, laminating resins, coatings, adhesives, and sealants, etc.) not only must be thermally and hydrolytically stable at the high temperatures of service or use, but also must be capable of being fabricated into the end use item. The ability to be fabricated means that the polymer either must melt and flow at some processing temperature, or be soluble in a readily vaporized solvent. To obtain both characteristics (temperature stability and processability) and also maintain high physical strength at temperature is the goal of all research efforts in the field of high temperature polymers.

Of the many types of polymer systems that show promise for high temperature, the phosphorus-nitrogen, or phosphonitrilic system is the most well known, see, for example, the following review articles:

Audrieth, Steinman and Toy, Chem. Revs. 32,109 (1943);
Shaw, Fitzsimmons and Smith, Chem. Revs. 62,247 (1962);
Schmulbach, Progress in Inorganic Chem. 4,275 (1962); and
Paddock, Quart, Revs. 18,168 (1964).

This unique inorganic backbone polymeric material has been known since 1834, and should form the basis of a family of polymeric materials useful at high temperatures. However, even though a great variety of polymeric materials has been synthesized over the years, no phosphonitrilic polymer has yet been prepared which has all three of the following essential performance features:

(1) is thermally stable above 500° C.;
(2) is hydrolytically stable; and
(3) is processable.

Any two of these characteristics can be achieved with a great number of phosphonitrilic polymers, but not all three. On the other hand, most carbon-carbon polymers can not be used above 350° C.

This invention has shown that new, double-strand, or ladder polymers can be prepared from cyclic tetrametric isomer of phenylphosphonitrilic chloride and its derivaties. These new ladder polymers do achieve all three characteristics.

The cyclic tetrameric isomers of phenylphosphonitrilic chloride are first prepared by reacting phenylphosphorus tetrachloride and ammonium chloride thusly:

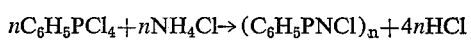

wherein *n* equals 3 and 4.

The product $(C_6H_5PNCl)_n$ is therefore a mixture of cyclic trimeric ($n=3$) and tetrameric ($n=4$) isomers. The tetramers are isolated from the trimers by crystallization, and reacted with ammonia to form the cyclic tetrameric phosphonitrilic ring:

Four geometric isomers of $[C_6H_5PN(NH_2)]_4$ or the cyclic tetrameric phosphonitrilic ring can exist. For brevity, we abbreviate most of the cyclic tetrameric PN ring as a rectangle, ($\phi$ represents the $C_6H_5$ ring):

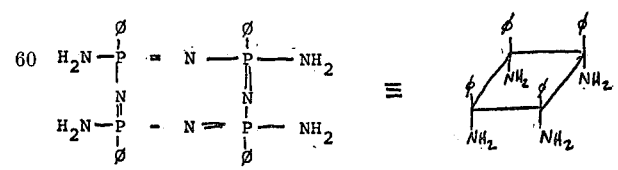

The four possible geometric isomers then have the following structures:

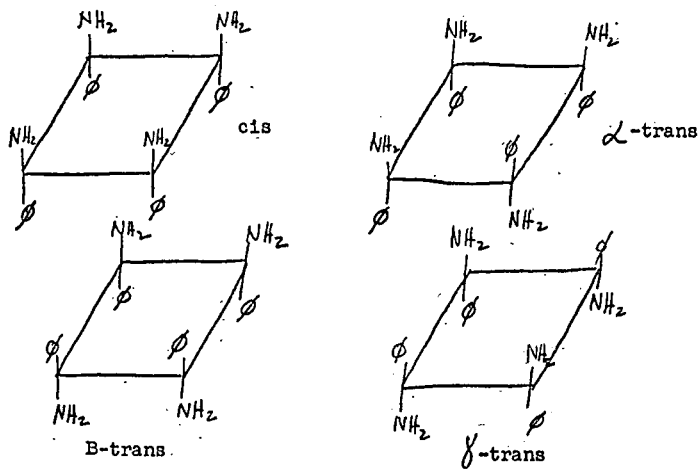

It is possible to prepare polymers from all four of these isomers; however, most of our work has been with the B-trans isomer, due to its higher yield. (B is hereinafter taken to mean "beta.") The chemistry of the invention is equally applicable to the cis-α-trans-, and γ-trans- isomers, and we do not wish to be limited to the B-trans isomer.

Early work with the B-trans isomer involved heating the isomer to a temperature above about 250°–260° C. under an inert atmosphere. Under these conditions, the isomer polymerized after evolving ammonia. The polymers produced had molecular weights of between 20,000–40,000, and were soluble in common organic solvents and were hydrolytically stable. However, at temperatures of 400° C. and higher, benzene was eliminated and rapid decomposition occurred. Thus, polymerization of the isomers did not provide any high temperature advantages.

We have now discovered that when B-trans [$\phi$PN(NH$_2$)]$_4$ is heated with a transition metal ion chosen from the group consisting of Co (II) Cu (II), Fe (II), and Ni (II) in a solvent at reflux for 6–36 hours, a polymeric adduct is obtained of the isomer B-trans [$\phi$PN(NH$_2$)]$_4$ and the metal ion. This adduct, when heated further, loses ammonia to form a polymer which is stable over 500° C., hydrolytically stable, and is soluble in common organic solvents such as acetonitrile, chlorobenzene, tetrahydrofuran, and dimethoxyethane. The exact structure of this adduct is unknown, although we have analyzed the product to obtain infrared spectra, chemical composition, and have made other analytical tests to further characterize the product.

Many transition metal salts have been and can be used to produce this type of polymer. CuCl$_2$, CoCl$_2$, NiCl$_2$, FeCl$_2$, and CuSO$_4$·H$_2$O all have been used successfully. In addition, similar polymers having good thermal stability can be prepared from α-trans-, γ-trans- and cis- [$\phi$PN(NH$_2$)]$_4$ and the same transition metal salts.

Generally, the polymeric adducts are 1:1, that is with one mole of metal appearing for each tetramer. However, we have prepared polymeric adducts having as low as 20 mole percent of metal, based on the polymer present.

The following discussion will more completely explain the polymerization conditions to obtain the thermally stable polymer.

The reaction of the B-trans isomer with the transition metal salt takes place in an inert solvent or in the melt under an inert atmosphere. Suitable solvents are acetonitrile, chlorobenzene, dichlorobenzene tetrahydrofuran, and dimethoxyethane. Preferably the solvents are polar, since the B-trans isomer should be partially soluble, and the metal salts also soluble to a slight degree. The inert atmosphere can preferably be nitrogen, although helium, neon, argon, etc., are also suitable.

The temperature at which the reaction is performed is at the reflux temperature of the solvent, which generally ranges from about 60–200° C. We prefer to use a temperature range of between 150–180° C. when the reaction is new in the melt.

The length of reaction time is dependent on the temperature at which the reaction is run. At the low end of the temperature range, it takes about 24 hours for the reaction, while 6–8 hours are required when the temperature is high.

The reaction generally progresses quickly, and the end point is evident by the complete solubilization of reaction mixture to a homogeneous solution.

The suitable transition metal salts are chosen from the group consisting of copper (II), cobalt, nickel, and iron (II). We prefer to use the chloride salts, although any salt which is relatively easy to prepare, and which is slightly soluble in the reaction solvent is suitable. Examples of suitable salts are the sulfate and nitrate salts.

The mole ratio of the B-trans isomer to the transition metal salt is generally 1–1, but can be 1–4.

If solvent is used, it can be employed in any amount necessary to maintain a one-phase reaction throughout. In other words, enough solvent must be present to solubilize the polymer product as it is formed. Generally, the amount necessary must be determined for each system employed.

While the foregoing discussion serves to describe the method used to prepare the polymeric adduct, this adduct must be further treated to provide the desired stability. The preferred treatment is heating over about 180–250° C., in either the melt or refluxing solvent, in an inert atmosphere. At this temperature, ammonia is evolved from the reaction. The heating is continued until no more ammonia is evolved, about 8–30 hours. At this point, the polymer is recovered as a thermally stable, hydrolytically stable, and soluble product.

The following examples will serve to illustrate this invention:

EXAMPLE 1

Preparation and separation of B-trans isomer

The reaction

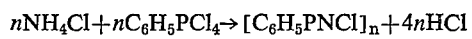

is carried out by first preparing $\phi$PCl$_4$ from $\phi$Pcl$_2$ and Cl$_2$ in an inert solvent. $\phi$PCl$_4$ is then added to a slurry of ammonium chloride in the solvent at the desired temperature. The evolved hydrogen chloride is trapped in water and the acidic solution is continuously titrated with standardized base. By this means the course of the reaction may be followed.

We had found that the yield of cyclic trimer and tetramer resulting from this reaction is affected by solvent, rate of addiction of $\phi PCl_4$ to the $NH_4Cl$ and temperature. The best yield of tetramer is 45.6% when chlorobenzene is used as the solvent. It was found that the yield of trimer increases and that of tetramer decreases when $\phi PCl_4$ is added slowly to the slurry of $NH_4Cl$ in chlorobenzene at reflux.

We have also established that the yield of tetramer can be increased further by using nitrobenzene as the solvent. Conditions have been optimized using nitrobenzene as a solvent to obtain a 61% yield of tetramer. In addition we have carried out this reaction in the melt and have obtained a 73% yield of tetramer.

The best yields of tetramer are obtained when the reaction temperature is 120–180° C., and preferably in the melt at 180° C. In addition, using a low concentration of $\phi PCl_4$ in the solvent optimizes the yield, and we prefer to use only about 20 mmoles of P for each 250–500 ml. of solvent.

Specifically, using a large scale preparation in nitrobenzene, 0.5 mole of $\phi PCl_4$ was rapidly added to a slurry of $NH_4Cl$ in nitrobenzene at 180° C. In 1.5 hrs. the reaction was 97% complete, based on the HCl evolved.

Of 76.2 of expected product, 61.3 g. of phenylphosphonitrilic chloride was recovered. Of this, 46.7 g. was separated as a mixture of tetramers, and identified by infrared analysis. Only 8.7 g. or 14% of this product, was trimer. The remaining 10% was hydrolysis product. This was identified by the strong broad absorption band in the infrared at about 950 cm.$^{-1}$.

The 46.7 g. of crude tetramers represents a 61% overall yield of $[\phi PNCl]_4$.

The crude mixture was fractionally crystallized and further extracted into three different tetramers. After further chemical treatment, the B-trans isomer was identified using proton nuclear magnetic resonance (N.T.R.) techniques. This isomer melts at 220–222° C., and the infrared spectrum was consistent with the theoretical structure.

EXAMPLE 2

Preparation of $[\phi PN(NH_2)]_4 \cdot CuSO_4 \cdot H_2O$ adduct

Copper sulfate-monohydrate (1.82 g., 1.0 mmole) and B-trans $[\phi PN(NH_2)]_4$ (1.0 g., 1.81 mmoles) were heated in chlorobenzene at reflux under nitrogen for sixteen hours. A green colored homogeneous solution was obtained, from which a green adduct having a molecular weight of 4720 was obtained. This adduct was soluble in acetonitrile, chlorobenzene, and tetrahydrofuran. When heated to 500° C. in air, however, decomposition was observed, evidenced by evolution of ammonia.

The infrared spectrum of the adduct is shown in FIG. 1. The representative peaks are at 3300 cm.$^{-1}$, the $NH_2$ doublet, at 1230–1200 cm.$^{-1}$, the P-N stretch, and at 750 and 690 cm.$^{-1}$, representative of the phenyl group.

Elemental analysis indicated that the adduct contained 50 mole percent copper II sulfate.

EXAMPLE 3

Deammoniation of the $[\phi PN(NH_2)]_4 \cdot CuSO_4 \cdot H_2O$ adduct

The adduct prepared in Example 2 was heated at 200° C. in the melt under nitrogen for 10 hours. At the end of this time, evolution of ammonia, which had been observed through the reaction, ceased. The deammoniated polymeric product was soluble in the same solvents as in Example 2, but when heated to 500° C. in air showed no decomposition. Elemental analysis showed that the adduct contained 50 mole percent copper, which could not be washed or removed by simple chemical treatment.

Figure 2:
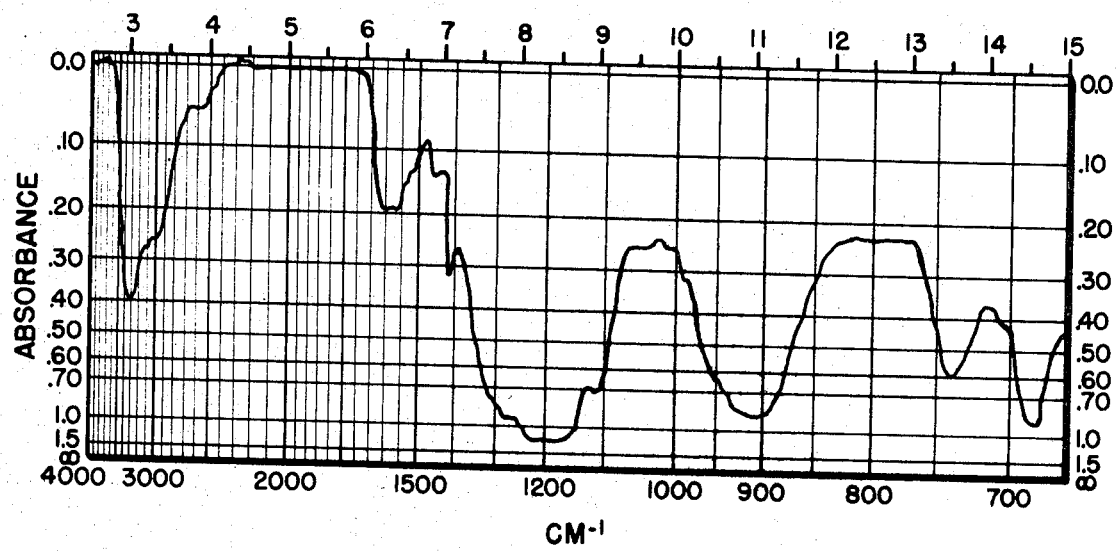

An infrared spectrum of the deammoniated product is shown in FIG. 2. By a comparison of FIG. 1 and FIG. 2, it can be seen that the doublet peak at 3300 cm.$^{-1}$ is now a singlet, indicating condensation of $NH_3$ from two $NH_2$ groups. The P-N stretch peak dropped from 1230 cm.$^{-1}$ to 1200 cm.$^{-1}$, indicating coordination of the metal ion with the nitrogen in the phosphonitrile ring. However, the two peaks at 750 cm.$^{-1}$ and 690 cm.$^{-1}$ are unchanged since they are indicative of monosubstituted phenyl groups.

EXAMPLE 4

Figure 3:
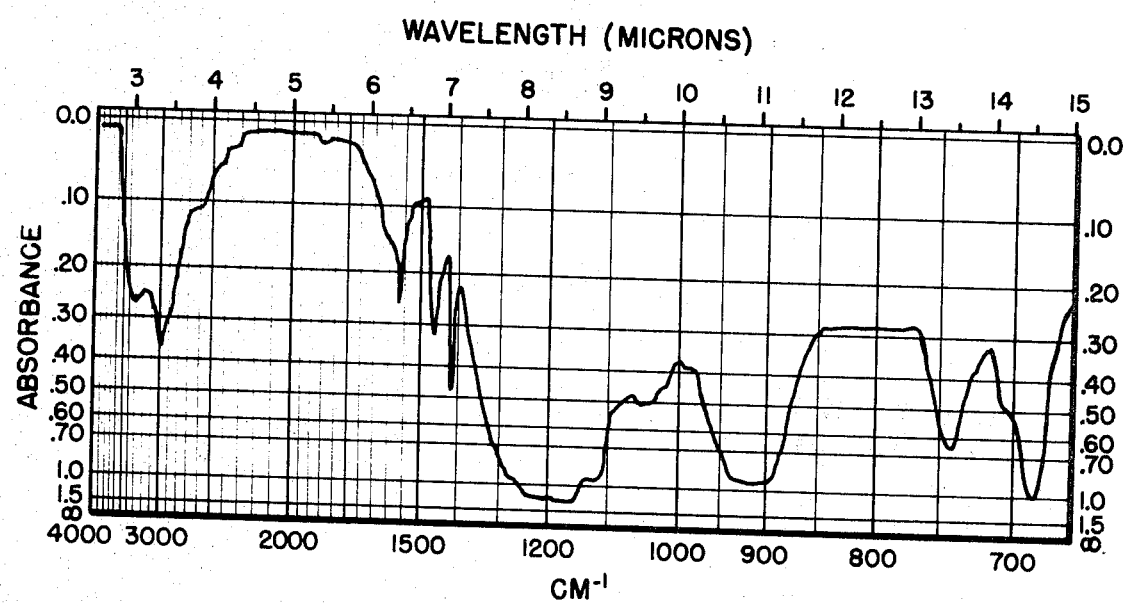

A solution of B-trans $[\phi PN(NH_2)]_4$ (5.0 g., 9.0 mmole) in 200 ml. of tetrahydrofuran (freshly distilled from $LiAlH_4$) was combined with $CuCl_2$ (1.21 g., 9.0 mmole) and this mixture was refluxed under an inert atmosphere for 24 hours, at which time a homogeneous solution was observed. The solvent was removed, and the green product obtained was heated under an intert atmosphere in the melt at 210° C. for 12 hours. At the end of this time, evolution of ammonia, which had been observed during the period, ceased. The product recovered was a green solid polymer having a cupric chloride content by standard analytical procedures of 50 mole percent, and the infrared spectrum shown in FIG. 3. Peaks in FIG. 3 are similar to those in FIG. 2, since the anion portion of the salt does not affect the spectrum. It will also be evident to one skilled in the art that the use of a different metal, as in the following examples, will not affect the IR peaks of the polymer produced thereby. All the polymers in the following examples show similar spectra after deammoniation no matter what transition metal is used. However, chemical analysis is used to determine the identity and amount of the metal in the polymer.

EXAMPLE 5

Preparation of cobalt-containing polymer in the melt

Anhydrous $CoCl_2$ was prepared by heating $CoCl_2 \cdot 6H_2O$ to 130° C. while passing a stream of HCl through the vessel. This process was continued until the weight of the material remained constant (at the theoretical weight) during a half-hour period.

A mixture of B-trans-$[\phi PN(NH_2)]_4$ (1.5 g., 2.7 mmole) and $CoCl_2$ (0.38 g., 2.7 mmole) was mixed with a mortar and pestle, then heated under nitrogen to a temperature of 200° C. After about 7 hours, the temperature was raised to 240° C., and ammonia was evolved from the reaction. After 4.06 mmole of ammonia was evolved, and another 6 hours had passed, the reaction stopped. The product, a bright blue solid, was soluble in dimethylformamide, tetrahydrofuran and chloroform. Elemental analysis indicated it contained 50 mole percent cobalt II chloride, had a molecular weight of 5000, and was stable above 500° C. in air. The infrared spectrum of the polymer was essentially the same as in Examples 3 and 4 since the identity of the metal does not change the infrared absorption peaks.

EXAMPLE 6

Preparation with $CoCl_2$ in acetonitrile

A solution containing B-trans-$[\phi PN(NH_2)]_4$ (1.5 g., 2.7 mmole) and anhydrous $CoCl_2$ (0.45 g., 2.7 mmole) in 150 ml. of anhydrous acetonitrile was heated to reflux for 24 hours. At this point, the product was recovered, and heated under nitrogen at 240° C. until evolution of ammonia ceased. The product was a bright blue solid weighing 1.7 g. for a yield of 80%. Elemental analysis indicated a 50 mole percent of cobalt II chloride. The polymer had excellent thermal stability. The infrared spectrum obtained was essentially similar to that shown for Examples 3 and 4.

EXAMPLE 7

Preparation with $NiCl_2$ in the melt

A mixture of B-trans-$[\phi PN(NH_2)]_4$ (2.0 g., 3.6 mmole) and $NiCl_2$ (0.46 g., 3.6 mmole) was heated under nitrogen for 8 hours at a temperature of 200° C. After this time, the temperature was raised to 230° C., and ammonia evolution started. During the remaining 6 hour period 4.1 mmoles of $NH_3$ was evolved. The product that was recovered had a yellow-green color, weighed 2.3 g. (90% yield) and was soluble in chloroform, methylene chloride, tetrahydrofuran and pyridine. Elemental analysis and an infrared spectrum were obtained, which indicated the preparation of a phosphonitrilic polymer consisting of polymeric deammoniated B-trans [C$_6$H$_5$PN(NH$_2$)]$_4$ containing 50 mole percent of Ni II chloride. The polymer showed excellent thermal stability.

EXAMPLE 8

Preparation with NiCl$_2$ in acetonitrile

A solution containing B-trans-[φPN(NH$_2$)]$_4$ (1.5 g., 2.7 mmole) and NiCl$_2$ (0.35 g., 2.7 mmole) in 150 ml. of acetonitrile was stirred at reflux for 24 hours. The adduct product, a yellow-green powder, weighed 0.85 g. for a yield of 20%. This adduct product evolved ammonia when heated under an inert atmosphere for 8 hours at 197° C. The final product was soluble in ethanol, tetrahydrofuran, and dimethylformamide. Elemental analysis and infrared spectrum were obtained, and indicated the preparation of a thermally stable polymeric deammoniated B-trans [C$_6$H$_5$PN(NH$_2$)]$_4$ containing 50 mole percent of Ni II chloride.

EXAMPLE 9

Iron-containing polymers

A solution containing B-trans-[φPN(NH$_2$)]$_4$ (1.5 g., 2.7 mmole) and FeCl$_2$ (0.34 g., 2.7 mmole) in 150 ml. of acetonitrile was stirred at reflux for 18 hours. After deammoniation following the procedure of Example 8, a pale yellow solid was obtained with a melting point of 96–106° C. Elemental analysis and an infrared spectrum were obtained for this product, and were consistent with a thermally stable polymeric deammoniated B-trans [C$_6$H$_5$PN(NH$_2$)]$_4$ containing 50 mole percent of Fe II chloride.

We claim:

1. A polymer composition prepared by reacting a mixture of [C$_6$H$_5$PN(NH$_2$)]$_4$ and 20 to 50 mole percent based on moles of [C$_6$H$_5$PN(NH$_2$)]$_4$ present of a metal ion selected from a group consisting of salts of copper (II), cobalt (II), nickel (II), and iron (II) at a temperature of 60 to 200° C. for 6 to 24 hours under an inert atmosphere to obtain a phosphonitrilic polymeric adduct, and subsequently deaminating said adduct by heating at a temperature of 180 to 250° C. for 8 to 300 hours under an inert atmosphere, said polymer composition being characterized by having a thermal stability in air of over 500° C. and solubility in common organic solvents.

2. The phosphonitrilic polymer composition of claim 1 in which the polymer is deammoniated polymeric B-trans [C$_6$H$_5$PN(NH$_2$)]$_4$.

3. The phosphonitrilic polymer composition of claim 2 in which the chosen ion is copper (II).

4. The phosphonitrilic polymer composition of claim 2 in which the chosen ion is cobalt (II).

5. The phosphonitrilic polymer composition of claim 2 in which the chosen ion is nickel (II).

6. The phosphonitrilic polymer composition of claim 2 in which the chosen ion is iron (II).

7. A phosphonitrilic polymeric adduct prepared by reacting a mixture of [C$_6$H$_5$PN(NH$_2$)]$_4$ and from about 20 to 50 mole percent based on moles of

[C$_6$H$_5$PN(NH$_2$)]$_4$ present of a metal ion selected from the group consisting of salts, copper (II), nickel (II), cobalt (II) and iron (II) at a temperature of 60 to 200° C. for 6 to 24 hours under an inert atmosphere, said adduct being characterized by an ability to be converted into a thermally stable phosphonitrilic polymer composition upon heating.

8. The phosphonitrilic polymer adduct of claim 7 in which the polymer is polymeric B-trans [C$_6$H$_5$PN(NH$_2$)]$_4$.

9. The phosphonitrilic polymer adduct of claim 8 in which the chosen ion is copper (II).

10. The phosphonitrilic polymer adduct of claim 8 in which the chosen ion is cobalt (II).

11. The phosphonitrilic polymer adduct of claim 8 in which the chosen ion is nickel (II).

12. The phosphonitrilic polymer adduct of claim 8 in which the chosen ion is iron (II).

13. A process for preparing a phosphonitrilic polymer composition which is characterized by having a thermal stability of air over 500° C. and which is soluble in common organic solvents comprising treating a mixture of [C$_6$H$_5$PN(NH$_2$)]$_4$, and 20 to 50 mole percent based on moles of [C$_6$H$_5$PN(NH$_2$)]$_4$ present of a member chosen from the group consisting of salts of copper (II), cobalt (II), nickel (II) and iron (II) at a temperature of 60 to 200° C. for 6 to 24 hours under an inert atmosphere to obtain a phosphonitrilic polymeric adduct, and subsequently treating said adduct at a temperature of 180 to 250° C. for 8 to 30 hours under an inert atmosphere to remove ammonia, and thereafter recovering the thermally stable phosphonitrilic composition.

14. The process of claim 13 in which the heating step to prepare the adduct takes place in a solvent.

15. The process of claim 14 in which the solvent is chosen from the group consisting of acetonitrile, chlorobenzene, tetrahydrofuran, dimethoxyethane, and dichlorobenzene.

16. The process of claim 15 in which the chosen temperature in the heating step to prepare the adduct is the reflux temperature of the chosen solvent.

17. The process of claim 13 in which the heating step to prepare the adduct takes place in the melt.

References Cited

UNITED STATES PATENTS

| 3,193,397 | 7/1965 | Stephens et al. | 106—15 |
| 3,265,639 | 8/1966 | Veltman et al. | 260—2 |
| 3,384,611 | 5/1968 | Grushkin | 260—2 |

SAMUEL H. BLECH, Primary Examiner

U.S. Cl. X.R.

260—30.4, 32.4, 32.6, 33.8, 543, 79.3, 551